US006511842B1

(12) United States Patent
Lamare et al.

(10) Patent No.: US 6,511,842 B1
(45) Date of Patent: Jan. 28, 2003

(54) CONTINUOUS REACTION METHOD BY SOLID/GAS CATALYSIS IN UNCONVENTIONAL MEDIUM, CORRESPONDING REACTOR AND USE OF SAID REACTOR

(75) Inventors: Sylvain Lamare, La Rochelle; Marie-Dominique Legoy, Perigny, both of (FR)

(73) Assignee: L'Universite de la Rochelle, La Rocelle Cedex (FR)

( * ) Notice: Subject to any disclaimer, the term of this patent is extended or adjusted under 35 U.S.C. 154(b) by 0 days.

(21) Appl. No.: 09/470,019

(22) Filed: Dec. 22, 1999

Related U.S. Application Data

(63) Continuation of application No. PCT/FR98/01592, filed on Jul. 20, 1998.

(30) Foreign Application Priority Data

Jul. 22, 1997 (FR) ............................................ 97 09298

(51) Int. Cl.$^7$ ................................................. C12M 1/36
(52) U.S. Cl. ............................. 435/286.5; 435/289.1; 435/299.1; 435/286.6; 435/287.5
(58) Field of Search ................................ 435/3, 4, 174, 435/43, 286.5, 286.6, 287.1, 287.5, 288.6, 299.1, 289.1

(56) References Cited

U.S. PATENT DOCUMENTS

| | | | |
|---|---|---|---|
| 4,375,950 A | * | 3/1983 | Durley, III ............. 236/15 BD |
| 5,504,006 A | * | 4/1996 | Rindt et al. |
| 6,143,556 A | * | 11/2000 | Trachtenberg |

FOREIGN PATENT DOCUMENTS

| | | |
|---|---|---|
| EP | 0 670 372 A2 * | 9/1995 |
| WO | WO 90/10696 A | 9/1990 |

OTHER PUBLICATIONS

Alan J. Russel & Fang Xiao Yang: "Catalyze Gas–phase reactions with enzymes", Chemtech, vol. 26, No. 10, Oct. 1996, pp. 24–27, XP002062593.

Sylvain Lemare & Marie—Dominique Legoy: "Working at Controlled Water Activity in a Continuous Process: The Gas/Solid System as a Solution", Biotechnology and Bioengineering, vol. 45, No. 5, Mar. 5, 1995, pp. 387–397, XP002062594.

Bart de Heyder et al.: "Ethene Removal from a Synthetic Waste Gas Using a Dry Biobed", Biotechnology and Bioengineering, vol. 44, No. 5, Aug. 20, 1994, pp. 642–648, XP000444315.

International Search Report dated Nov. 24, 1998.

Pulvin S., et al.; "Enzyme technology and Gas Phase Catalysis: Alcohol Dehydrogenase Example"; *Biotechnology Letters*; 1986; vol. 8, No. 11, pp. 783–784.

(List continued on next page.)

*Primary Examiner*—William H. Beisner
(74) *Attorney, Agent, or Firm*—Merchant & Gould P.C.

(57) ABSTRACT

The invention concerns a continuous reaction method by solid/gas catalysis in unconventional medium, using different substrates to obtain predetermined products, substrates and products forming compounds, which consists in controlling: the reaction in temperature to determine the saturation pressure of each pure compound taking part in determining the compound thermodynamic activity; the total pressure at a level lower than atmospheric pressure; the molar flow rates of the compounds and the vector gas, to adjust the gas mixture molar composition on the basis of the predetermined values of the thermodynamic activity of said compounds.

26 Claims, 5 Drawing Sheets

OTHER PUBLICATIONS

Figure 1:
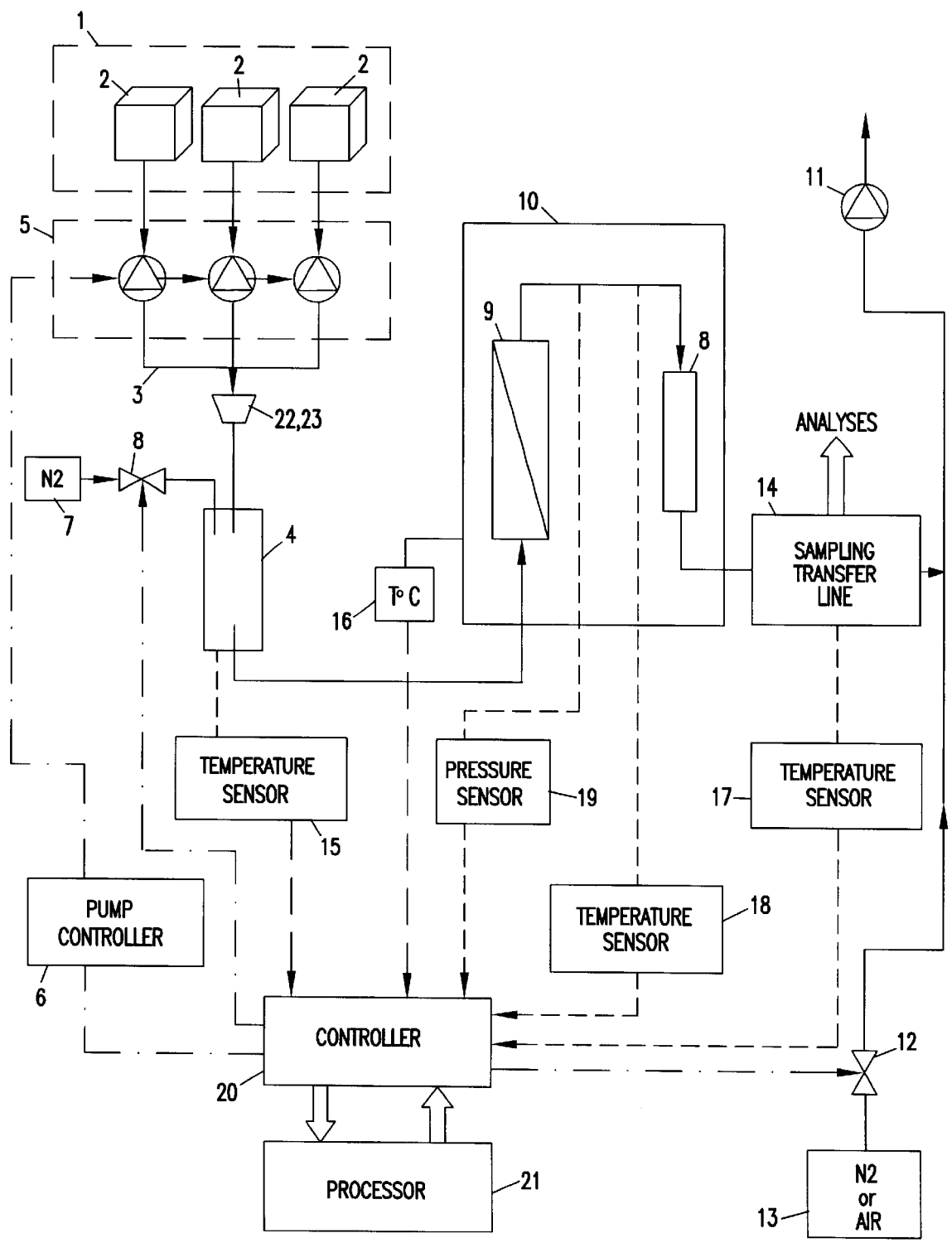

Sylvain Lamare, et al.; "Working at controlled Water Activity in a Continuous Process: The Gas/Solid System as a Solution"; *Biotechnology and Bioengineering* 1995; vol. 45, pp. 387–397.

Sylvain Lamare, et al.; Biocatalysis in the gas phase; *Trends in Biotechnology*; Oct. 1993; vol. 11, pp. 413–418.

P.J. Halling; "Effects of water on equilibria catalysed by hydrolytic enzymes in biphasic reaction systems"; *Enzyme Microb. Technol.*; Nov. 1984; vol. 6, pp. 513–515.

J.M. Le Lann, et al.; "A computer program for the prediction of thermodynamic properties and phase equilibria"; *International Chemical Engineering*; Jan. 1988; vol. 28, No. 1, pp. 36–45.

Ceccaldi, P., "La Bioépuration De L'air Promise ``un bel Avenir", *Biofutur*, pp. 20–21 (Sep. 1993) in French; English translation provided.

* cited by examiner

CONTINUOUS REACTION METHOD BY SOLID/GAS CATALYSIS IN UNCONVENTIONAL MEDIUM, CORRESPONDING REACTOR AND USE OF SAID REACTOR

This application is a continuation application of PCT/FR 98/01592 filed Jul. 20, 1998 which claims priority under U.S.C. § 119 to patent application 97/09298 filed in France on Jul. 22, 1997.

The present invention relates to the continuous operation of reactors in non-conventional medium, i.e. non-aqueous, in particular for catalytic reactions utilizing essentially a solid phase and a gas phase.

Solid/gas catalytic reactions in which the solid phase of the reactor is constituted by an enzyme and the substrates or products of the reaction are in the form of a gas have been described by Pulvin S., Legoy M. D., Lortie R., Pensa M. and Thomas D. (1986) Enzyme technology and gas phase catalysis: alcohol dehydrogenase example. Biotechnol. Lett., 8, 11, pp 783–784. Catalytic systems which make use of whole cells as constituent elements of the solid phase of the reactor are also known.

Solid/gas catalysis offers in fact certain advantages compared to the conventional systems of the solid/liquid type:
- it makes it possible to dispense with the use of solvents and to operate solely with the substrates and the products of the reaction in the immediate environment of the enzyme;
- since the solid phase is composed of the biocatalytic element itself, the binding and immobilization steps prove not to be necessary.
- the productivity is improved since the mass transfers are large owing to the high diffusivity and the low viscosity of the gas phases.
- the gas phase is composed of pure substrates and products and of a vector gas, no solvent is used which facilitates the treatment downstream of the reaction medium.

Solid/gas catalysis requires a higher working temperature than conventional systems. As a result the risks of microbial contamination of the elements of the reactors are less.

The principle of it is the following:

The conversion of a gas substrate optionally transported by a vector gas undergoes conversion at the interface of a solid biocatalyst (enzyme or whole cells), the reaction products being recovered in the form of a gas.

The principles of solid/gas catalysis, the parameters of the reactions concerned are described in Biotechnology and Bioengineering, vol. 45, pages 387–397 (1995).

At present, it has been possible to obtain only a few chemical compounds such as epoxides, aldehydes and esters by solid/gas catalysis systems (ref.). But the principal limit of the existing system is the maintenance of an active biocatalyst and, consequently, its compatibility with industrial use.

A promising application for the reactors of this type relates to the treatment of polluted gas effluents since the range of molecules which need to be eliminated from industrial wastes before their release into the atmosphere is increasing incessantly. They include aldehydes, alcohols, ketones, carboxylic acids, cresols, phenols, sulfur-containing derivatives, cyclic amines, alkanes or esters. An improvement in the depollution procedures of soils may also be achieved by such systems.

However, the solid/gas catalysis systems are related in the first instance by the multiplicity of the constitutive elements which leads to a lack of control of the different parameters, in particular those depending on the complex role of water. In fact, the state of hydration of the enzyme preparation exerts an antagonist effect on the catalytic activity and on the stability of the catalyst with time.

The solid/gas phase reactors developed up to now (Lamare et al., Trends iin Biotechnology (1993) 10 (117): 413–418) are designed to operate at atmospheric pressure, although they are capable of working at temperatures ranging up to 220° C. with a controlled thermodynamic activity for each constituent. The definition and importance of the term activity in carrying out the solid/gas enzymatic reaction is described below.

They are inoperative for all the applications in which the components are poorly volatile, i.e. for all the components whose boiling point is situated in the range of 150–250° C. Now to-day many reactions capable of being developed because they represent an industrial interest involve compounds whose saturation pressures are low and even close to 0 at the working temperatures used located between 50 and 150° C., temperatures compatible with maintenance of the biocatalyst in an active form.

The principal obstacle of the existing systems lies in effecting the transfer to the gas phase of all the components of the system, the reaction substrates and products obtained. No bioreactor permits this conversion. Furthermore, the expense caused by the massive use of a neutral vector gas for a large scale supply to a solid/gas reactor makes the use of this reaction procedure prohibitive for industrial purposes.

Many examples attest to the important role of water in enzymatic catalysis in non-conventional medium. A simple manner of defining the thermodynamic activity of water consists of using the water vapour pressure of the gas phase in equilibrium with the system considered. One may then write:

$$a_w = Pp/Ppref$$

where Pp is the partial pressure of the water above the system and Ppref the so-called reference partial pressure measured at the same temperature above pure water. The $a_w$ of a system is hence a function of physical parameters characterizing a system such as the absolute pressure and the temperature: it is the equilibrium parameter permitting the state of the water to be defined; it allows the influence of water to be unequivocally quantified in a system where the polarity, the dielectric constant of the present chemical entities, the number of phases, the temperature have a considerable influence on the distribution of water in the different phases of the system.

Halling (Halling P. (1984) in Effect of water on equilibria catalysed by hydrolytic enzymes in biphasic reaction systems, Enzyme Microb. Technol., 6, pp 513–515) has illustrated the equilibrium which may exist between the different states of water and the different phases of a complex medium (state of hydration of the biocatalyst and of the other components, quantity of water dissolved in the solvent, partial pressure of water vapour above the system), this equilibrium being a function of the activity of the water.

The value of the thermodynamic activity of the water of a system depends on the physical parameters characterizing this system, such as the absolute pressure and the temperature. The value of the thermodynamic activity of the water is therefore regulated in order to establish the equilibrium operating conditions between the different phases of the reactor; it is thus a decisive parameter for optimizing the reactor and its operating conditions.

The present invention proposes a solution to the problems evoked above by implementing reactions catalysed in the solid/gas phase at reduced pressure in order to optimize the productivity and reduce the expense by minimizing, and even eliminating, the use of a neutral gas vector, by referring to the thermodynamic activities of the water and of the compounds used.

More precisely, the object of the invention is a continuous reaction process by essentially solid/gas catalysis in non-conventional medium, implementing different gas substrates in order to obtain defined products. This process consists of controlling the temperature, which determines the reference saturation pressure of each pure compound, the total pressure of the system and the molar fluxes of the compounds in order to regulate the molar composition of the gas mixture as a function of the values of thermodynamic activity determined for the compounds.

The invention also relates to a reactor featuring suitable means for implementing this process. Such a reactor comprises pumps for controlling the flux of each of the liquid substrates, mass flow meters for the addition of a vector gas and probes for controlling the temperature of an expansion mixer of the substrates in the gas phase, of a reaction chamber comprising a bioreactor containing a biological catalyst and in which the substrates are introduced via a heat exchanger, of the bioreactor and of an analytical sampler at the reaction chamber outlet. A vacuum pump coupled to a vacuum regulation valve is also mounted at the reaction chamber outlet. The pumps, the probes and the valve are connected to a command control coupled to a management processor. As a function of the data received and management algorithms that it applies, the processor transmits in a time-dependent manner command signals to the different organs (pumps, probes and valve) in order to regulate the temperature, the total pressure and the molar fluxes as a function of the values of thermodynamic activity determined.

By biological catalyst is meant any catalyst constituted or derived from a living organism, animal, plant, bacterial, viral or fungal; it may be a whole cell, a cellular organelle, a macro-molecular complex or a molecule, in particular proteins, nucleic acids or mixtures of these latter and exhibiting a catalytic activity.

The process used in the invention makes it possible to increase the productivity of the system compared to a system operating at atmospheric pressure, to minimize or abolish the quantity of vector gas used, to enhance the abundance of the substrates in the gas phase without having to increase the temperature excessively, while diminishing the spatial requirements for a reactor at atmospheric pressure. These advantages may coexist, their respective effects being then modulated.

The possibility to dispense with the vector gas is realized by replacement of this gas by the lowest boiling compound of the compounds introduced in the vapour phase; the thermodynamic activity of this compound may be reduced as a function of the absolute pressure $P_a$ of the system; it then fulfills the function of a vector gas in the process of the invention.

Another advantage of the invention lies in the improvement of the stability of the biological catalyst as a result of the fact that the hydration, on which its thermostability depends, is controlled.

In a particular embodiment and in order to avoid constant modification of the composition of the gas phase during the course of time, the gas to be converted during the reaction results from a mixture of several compounds in liquid form, followed by flash vaporization achieved at high temperature (for example 450° C.) with the optional addition of a neutral vector gas after vaporization, if for example it is not desired to reduce the thermodynamic activity of the water.

The reactor according to the invention makes it possible to control the microenvironment of the biocatalyst with precision. It is then possible to cause an enzyme to function and to observe its kinetic behaviour and its solvation/hydration and to validate the modelling of certain interactions, for example protein/ligands interactions.

This reactor opens the door to novel industrial technology where only the effective availabilities of the substrates and water for the enzyme, defined by their thermodynamic activity, are taken into account, making it possible to quantify their effect on catalysis at the molecular level.

The reactor according to the invention as well as the process implemented present many industrial advantages detailed below and which make it possible to:

determine the cost price of the compounds obtained, enlarge the range of the utilizable substrates and products as well as the range of catalyzable reactions, use substrates with high boiling points, control the thermodynamic activities by permitting modifications of free energy of reaction which allows the use of the same catalyst for different reactions including, for example, hydrolysis, transesterification and syntheses in the case of the lipases (example 1 below).

a) Diminution of the Cost Price

The first advantage is apparent in terms of the cost price of the compounds obtained as a result of their implementation for the following reasons: the diminution or abolition of a vector gas simplifies the design of the reactor, reduces the fixed costs of production.

b) Increase of Productivity

The substrate itself can be its own vector which thus enables its relative concentration to be increased and leads to a considerable increase in the productivity of the reaction, i.e. increases the quantity of the products obtained; in fact, the total pressure is reduced to a minimum in order to increase accordingly the $n/n_{tot}$ ratio of each product X, since the partial pressure of each compound is fixed by the value of the thermodynamic activity of said compound. For example, for a conversion at 80° C. of a compound with a reference partial pressure of 0.5 atm at this temperature and with a thermodynamic activity of 0.1, the partial pressure of X in the gas to be converted is then equal to 0.05.

For a system operating at atmospheric pressure, the ratio $n/n_{tot}$ is then equal to 0.05. Thus, X represents only 5% of the molar composition of the gas phase.

In a system operating at a reduced absolute pressure of 0.5 atm, the ratio $n/n_{tot}$ necessary to obtain a thermodynamic activity of 0.1 is then equal to 0.1. X thus represents 10% of the molar composition of the gas phase to be converted.

For an operation at constant molar flux in the two systems, the productivity of the system at reduced pressure is multiplied by a factor of two.

The productivity of a system operating at reduced pressure thus leads to a gain in productivity equal to $1/P_{abs}$ of the system when these two reactors are compared at constant molar flux.

The reduction of the total pressure of the system also generates a reduction of the amount of vector gas for a given productivity.

In the preceding comparative study, the reduction by half of the total pressure of the system makes it possible to multiply the productivity by two. The choice to obtain an equal productivity makes it possible to feed the reactor with twofold less of the gas phase per unit time. In an embodiment such as the latter, the costs generated by the use of a vector gas such as nitrogen are reduced by a half compared with a system operating at atmospheric pressure.

c) High Boiling Substrates

The reduced pressure reactor of the present invention also allows high boiling substrates to be used. This embodiment "restrains" the thermodynamic activity of water, eliminates completely the necessity for a vector gas and leads to a large increase in the productivity of the reactor.

For example, with the use of a catalyst which necessitates an activity of water of about 0.1, the total pressure of the system is advantageously fixed at 0.1 atm, which corresponds to the partial pressure of water necessary for obtaining an activity equal to 0.1 for a catalysis conducted at 100° C. At this temperature the vector gas is constituted solely of water in the form of vapour, within which the substrates are incorporated at up to several matm partial pressure.

In a system defined according to the present invention, the thermodynamic activity of water does not exceed the threshold value of 0.1 even in the case where water is produced by the reaction. The reactor of the present invention avoids any denaturation of the catalyst by an uncontrolled increase of the thermodynamic activity in the system. The productivity of the reactor of the invention for the conversion of the substrates is then multiplied by a factor of 10 compared to a system operating at atmospheric pressure.

d) Displacement of the Reaction Equilibria

The restraint of the thermodynamic activities of certain compounds thus favours the displacements of the reaction equilibrium, while increasing the productivity and diminishing the consumption of vector gas.

The advantages of the solid/gas catalytic reactors operating at reduced pressure make it possible to envisage their use in many fields of economic activity. As examples, mention may be made of:

1) the use of the reactor for the production of organic molecules such as alcohols, carboxylic acids, thiols, thioesters, esters, aldehydes, ketones, alkene oxides, starting from substrates which may be carboxylic acids, primary and secondary alcohols and ketones in particular.

Another aspect of the invention is the use of the solid/gas catalytic reactor for the production of organic molecules cited above. When esters or aldehydes are concerned, obtained by enzymatic conversion of carboxylic acids and alcohols, the products thus obtained can be used as flavours and/or perfumes in the cosmetic or agri-foodstuffs industry, for example. Another advantage of the products thus obtained is that, contrary to those obtained by chemical conversion, they may claim to be natural in conformity with the European directive of Jun. 22, 1988.

Another aspect of the invention is the use of the solid/gas catalytic reactor for the treatment of gas effluents, emanating from industrial processes generating polluted gas phases; in addition to conventional compounds such as $SO_2$, $H_2S$, oxides of nitrogen, mention may be made of aldehydes, alcohols, ketones, carboxylic acids, cresols, phenols, sulfur-containing compounds, cyclic amines, alkanes or esters (Paul Ceccaldi, 1993, Biofutur, No. 126, p. 20).

Another aspect of the invention is the use of solid/gas catalytic reactors for analytical purposes such as the design of enzymatic precolumns for derivatization or acylation for gas chromatography (GC), the development of a gas phase affinity chromatography or the invention of biosensors specific for the detection of volatile molecules (invention of artificial "noses") are so many directly applicable uses.

Another aspect of the invention is the use of enzymatic reactors in which entire bacterial, animal, plant or fungal cells are used to perform bioconversions. The advantage of the reactor, in this type of use, is that the metabolic activities of the cells in question may be maintained for a sufficiently long period as a result of the control of the thermodynamic activity of water, thus making it possible to perform complex catalytic reactions, in several steps within the same reactor.

Moreover, from the point of view of the use of whole cells in bioconversions, the preparation of the biocatalyst may be achieved in situ and the metabolic activities or their regeneration may be maintained by the control of the thermodynamic activity of water by the process and the reactor according to the invention.

Other advantages and characteristics of the reactor, its operation and its use according to the present invention will become apparent on reading the description which follows, accompanied by the appended figures which represent, respectively:

FIG. 1, a diagram of a three stage reactor according to the invention;

FIGS. 2 to 5, management organigrams of the successive commands of the principal organs of the continuous reactor according to the invention, namely respectively:

an algorithm for initialization and access of the principal parameters, an algorithm for creation of tables of the operating conditions and the analytical sequences;

an algorithm for access and control of the parameters; and an algorithm for treatment of the results and end of experimentation.

The present invention makes use of continuous and precise control of three parameters of a reduced pressure reactor in the solid/gas phase: the temperature, the total pressure of the system, called hereafter absolute pressure, and the molar fluxes of the compounds, i.e. of all the gas substrates.

By molar flux is meant the quantity of matter which circulates in the reactor per unit time and is expressed as moles per hour (mol/h).

The absolute pressure and the temperature are implicated in the value of the thermodynamic activity of a compound.

The absolute pressure Pa is implicated directly since it is included in the definition of the partial pressure PpX of n moles of a compound X in a gas phase of ntot moles by the relationship:

$$PpX=(n/n_{tot}).Pa$$

The temperature is implicated in the determination of the reference saturation pressure of the pure compound X, PpXref, which conditions the value of the thermodynamic activity of this compound X, aX, defined by $$aX=PpX/PpXref$$

The control of the three parameters mentioned above (temperature, Pa and molar fluxes) is illustrated by the example of the embodiment of the reactor according to the invention presented in FIG. 1.

Three stages are defined.

A first stage is designed to produce the gaseous mixture of the substrates. The liquid substrates 1 issuing from vats 2 containing the pure products are transported by pipes 3 towards the high pressure dosage pumps 5, range of use 0–1.5 mL/min. The dosage pump outlets are then pooled in a mixing chamber 22 of dead volume equal to 50 µl and an excess pressure device 23, calibrated at 20 bars, is placed downstream from the mixing chamber in order to avoid any emptying of the pumps by the reduced pressure prevailing downstream. All of the pipework concerning the liquid stream is made of stainless steel or teflon PTFE tubes ¹⁄₁₆th of an inch in diameter in accordance with the pressure constraints exerted, all connections are of the "Swagelock" type. The pipework for the gas phase is made of stainless steel ⅛th of an inch in diameter, all connections are of the "Swagelock" type.

The liquid mixture is then introduced into a mixer-injector 4, maintained at a temperature of 450° C in order to produce a liquid-vapour flash. An additional neutral gas inlet is created convergently within the mixer-injector 4 and this gas flux is controlled by a mass flow meter 8, whose range is 0–500 ml/min.

The second stage relates to the reaction between the substrates. The substrate mixture is conveyed from the injector 4 to the bioreactor proper 8 through a heat exchanger 9. The bioreactor contains the enzyme preparation. The bioreactor 8 and the exchanger 9 are placed in the same reaction chamber 10. The maintenance of the temperature is ensured by regulation of the water vapour pressure in a double envelope at 1.2 bars for 120° C. Electrical resistances could be used as an alternative, even an electrical heating process.

The third stage relates to the equipment for control and analysis. A vacuum pump 11 coupled to a vacuum control valve 12 and to a vacuum break detector is located at the bioreactor outlet, outside the reaction chamber 10. A post-reaction sampling chamber 14 is inserted in this outlet line by transfer with the aid of a pneumatically controlled multichannel valve (not shown).

Temperature control probes consisting of thermocouples 15 to 17 are distributed in the various organs respectively:

in the mixer-injector 4;

in the reaction chamber 10;

in the sampling chamber 14.

The probe 18 makes it possible to measure the temperature and the thermodynamic activity of water in the gas entering the catalytic bed 8. At this same inlet, provision is also made for a pressure probe consisting of a piezoresistive sensor 19. This sensor covers a range from 0 to 1250 mbars and operates in absolute measurements. The set of temperature and pressure probes is connected to a controller 20 which controls the vacuum regulation valve 12 in the bioreactor 8. This control is made as a function of the data supplied by a microprocessor 21 in response to the data transmitted by the different probes and recorded by the microprocessor. The automation and regulation of the operating conditions as a function of the data received are assured by an appropriate management algorithm.

In operation, the vector gas is used optionally in certain reactions for the adjustment of the partial pressures of the substrates in the mixer 4. At the reactor outlet, the vector gas is recovered with the aid of a compressor and recycled for reintroduction into the mixer.

This mixer 4 is an expansion chamber for converting the substrates into a gas phase heated to 450° C. in the embodiment example. An ultrasonic head used as nebulizer facilitates the evaporation of the substrates by a considerable increase of the exchange surface resulting from an injection in the form of a fog. The gas is introduced into the bioreactor by reducing the pressure which results in a gas discharge within the reactor, a discharge facilitated or not by the optional presence of an additional vector gas. This pressure reduction is created by the installation of a vacuum pump at the reactor outlet.

Analytical sampling of the gas phase at the bioreactor outlet 8 is effected by a 250 µl loop, then by injection on to a GC column (gas chromatography) for the determination of its composition. The detection is performed by two sensors, a thermal conductivity detector for water and a flame ionization detector for all of the other organic molecules.

The automatic control of the different organs of the reactor is effected by means of the microprocessor 21 coupled to the different probes and valves by a 16-channels A/D (analog/digital) conversion chart, 8 channels D/A conversion 12 bits, 40 E/S TlL, 6 counters:timers. The management algorithm records the different temperatures measured, calculates the partial saturation pressures of the different substrates and delivers the instructions for the flow meters 6 and 8 as well as for the vacuum regulation valve 12.

Double paneled thermocouple conditioners make it possible to obtain accuracies for the temperature measurements of +/−0.1° C. over a range of 20° to 150° C. The accuracy of the entered and read-out values of the flow meters is +/−0.5% of the maximal capacity of the flow meters, that of the pressure measurements is +/−1 mbar. The calculation of the saturation pressures is made by linear regression of the exponential type, with a maximal absolute error of $+/-5.10^{-4}$ atm.

In a particular embodiment, in order to avoid constant modification of the composition of the gas phase with time, the gas to be converted during the reaction results from a mixture of several gases. The process then uses the liquid/vapour equilibrium for a first pure body in order to generate a first gas, then this first gas is mixed with other gases obtained in an identical manner.

In order to adjust the different parameters, a model is used to fit the reactor to the reaction envisaged. The first step consists of defining the molar flux of each compound. Having access to the normalized volumic flux (QVN2 normalized), the molar flux of nitrogen (QN2) as vector gas is equal to:

$$QN2 = QVN2 \text{ normalized}/R.T \text{ (mol/h at } T=273.15° \text{ K.)}$$

Knowledge of the volume flux of each compound X ($QV''X$) makes it possible to calculate the molar flux of each constituent ($Q''X$) from the formula:

$$Q''_X = QV''_X \cdot r/MM \text{ 5 mol/h) with r: density of the product, MM: molar mass of the product}$$

Knowing then all the molar fluxes and the absolute pressure Pa in the system, it is then possible to calculate the partial pressure of each of the compounds in the gas input (PpnX) by means of the formula:

$$Pp''_X = Pa \cdot Q''_X / (QN2 + S^i Q^i X)$$

The saturation curves $P_{pn}Xsat = f\{T\}$ can be determined by using software for the calculation of the physical properties such as those developed in the language "Prosym" (by the software "PROPHY") (Joulia X et al. (1988), Intern. Chem. Eng. 28: 36–45) and are used to calculate the reference saturation pressure of each compound ($Pp''_X sat \text{ ref}$) at the temperature of the bioreactor.

The calculation of the activity of each compound is then given by the formula:

$$aX = Pp''_X / Pp''_X sat \text{ ref}$$

The real volumic flux within the reactor is calculated by using the following formula:

$$Qvtotal = R.T.(QN2 + S^i Q^i X)/Pa \text{ with } T = \text{temperature of the bioreactor in degrees Kelvin.}$$

The algorithms used define and manage with time sequences of events concerning the gas fluxes in order to vary the operating conditions, programmable as vapour pressure or thermodynamic activity, manages the sample injection sequences into the analytical equipment and monitors in real time the control parameters in the reaction chamber : inlet and outlet fluxes, partial pressures, molar flux and activity of each substrate and product, temperatures, residence times. The access frequency is 2 Hz. FIGS. 2 to 5 represent an example of management algorithms for, respectively, the initialization of the reactor (FIG. 2), access of tables of events (FIG. 3), wait/start reaction mode (FIG. 4) and end of reaction (FIG. 5).

Figure 2:
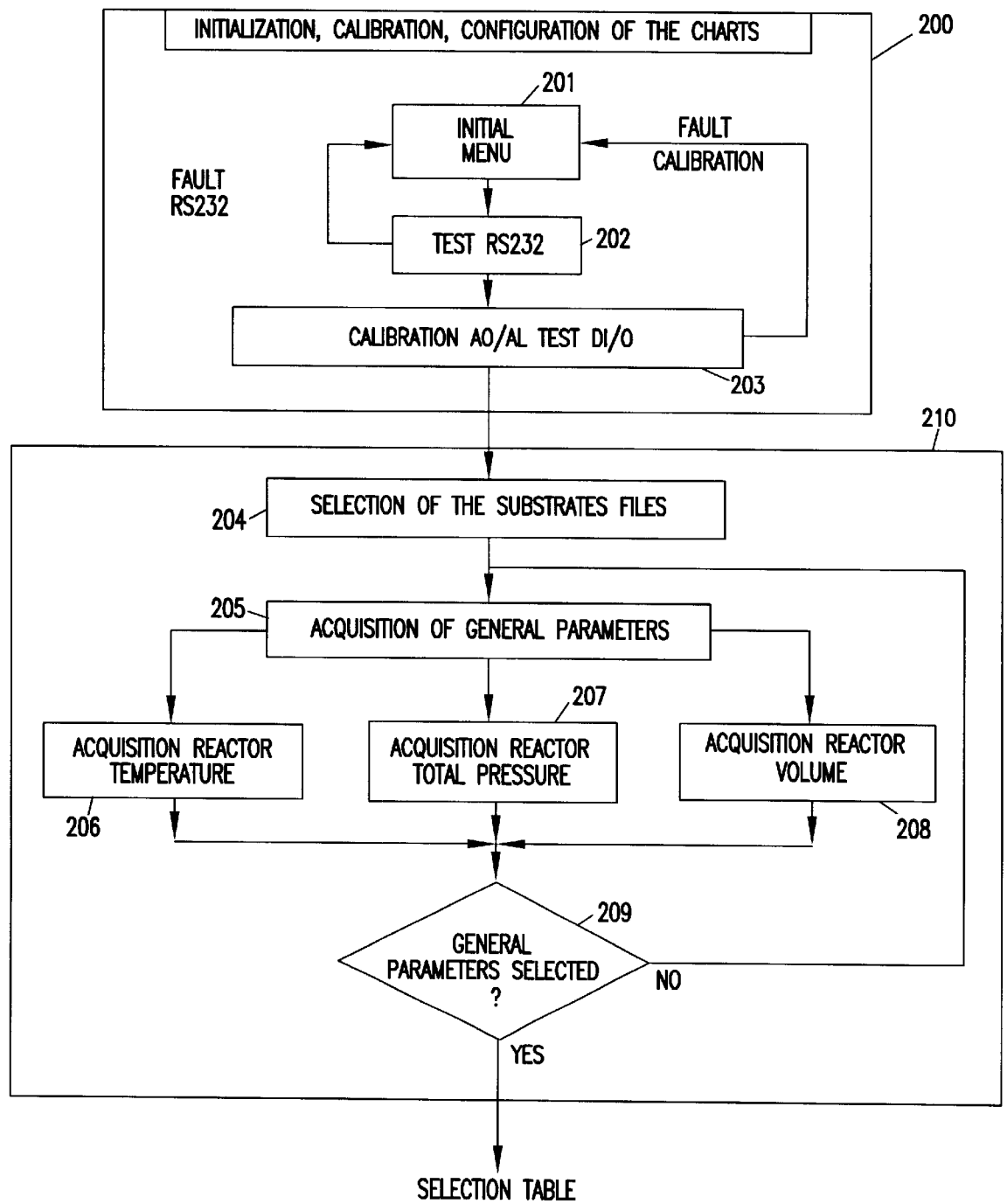

The algorithm of FIG. 2 makes possible the initialization of the experimentation, the calibration and configuration of the charts in block 200 by a suitable test corresponding to the steps 201, 202 and 203. The access of the general parameters temperature, pressure and volume of the reactor is effected at repertory 210 by the steps 204 to 209.

Figure 3:
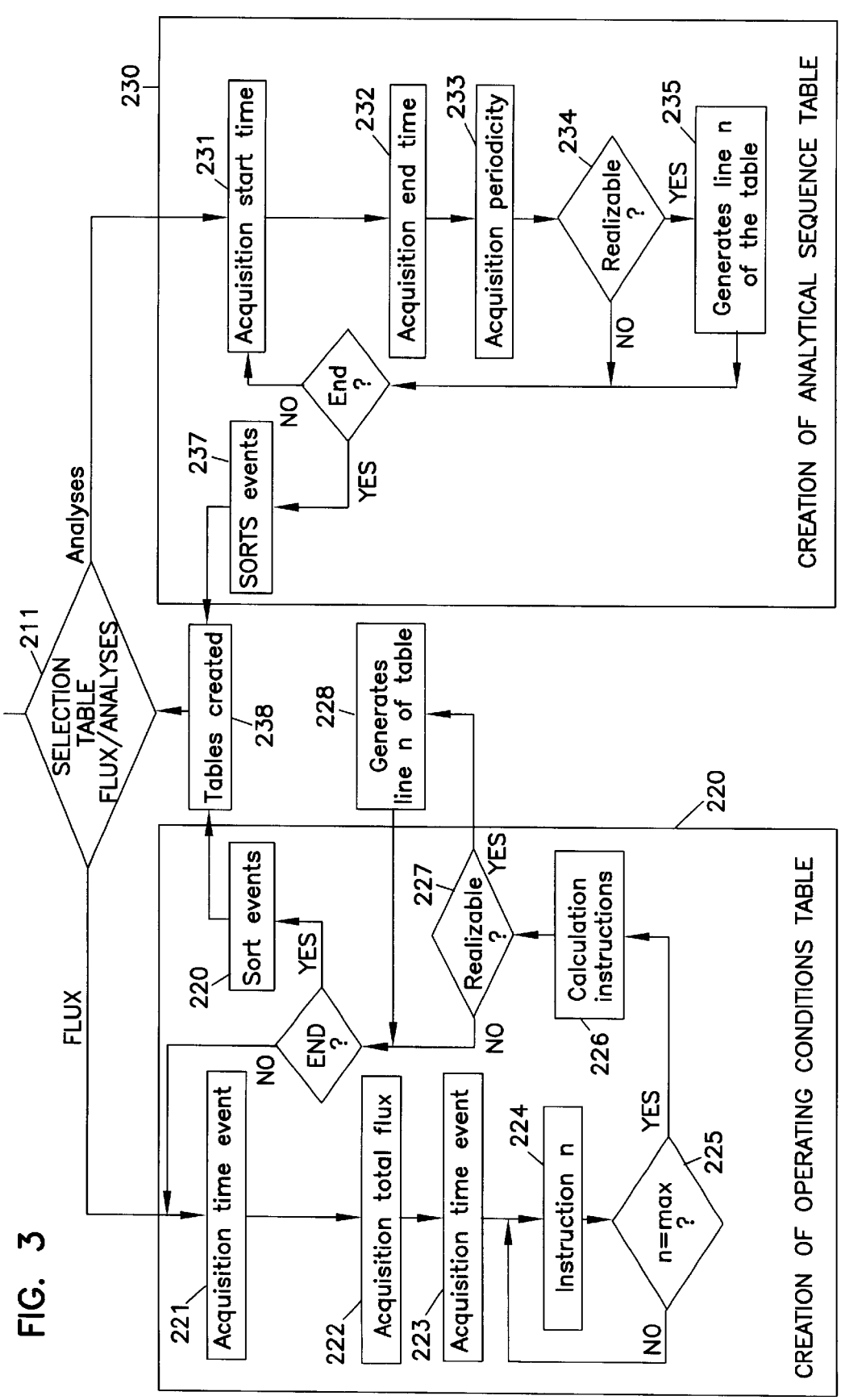

In FIG. 3, once the general parameters have been chosen (step 209), the algorithm consists of choosing the flux/analysis table at step 211 from the creation cartridges 220 and 230, respectively, of the table of the operating conditions (by acquisition of the events' times and the total flux as a function of an instruction value at steps 221 to 225 and by sorting of the events at steps 226 to 229) and the table of the programmed analytical sequences at steps 231 to 235 and sorting of the events at steps 236 and 237. The tables created are stored at step 238.

Figure 4:
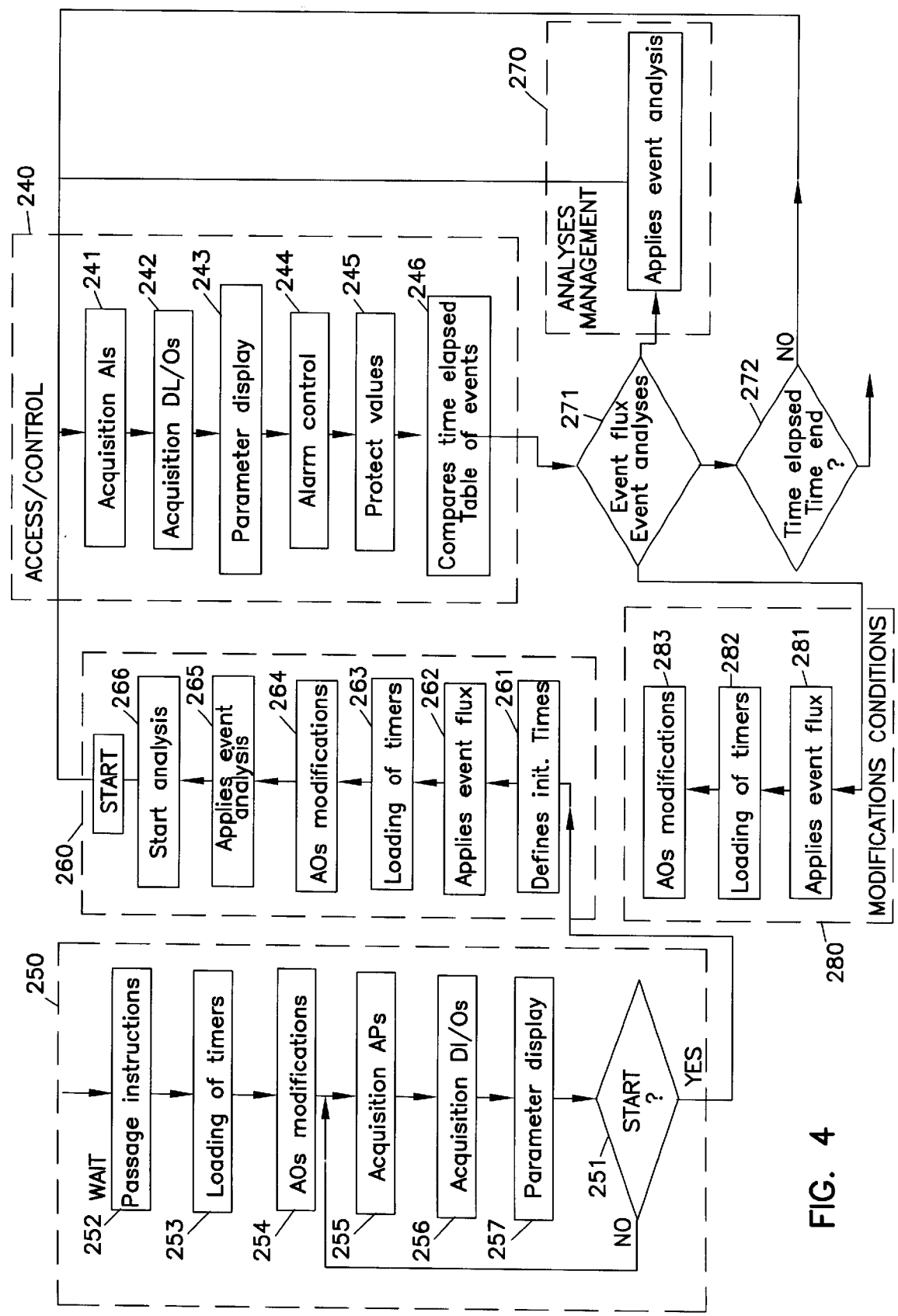
Figure 5:
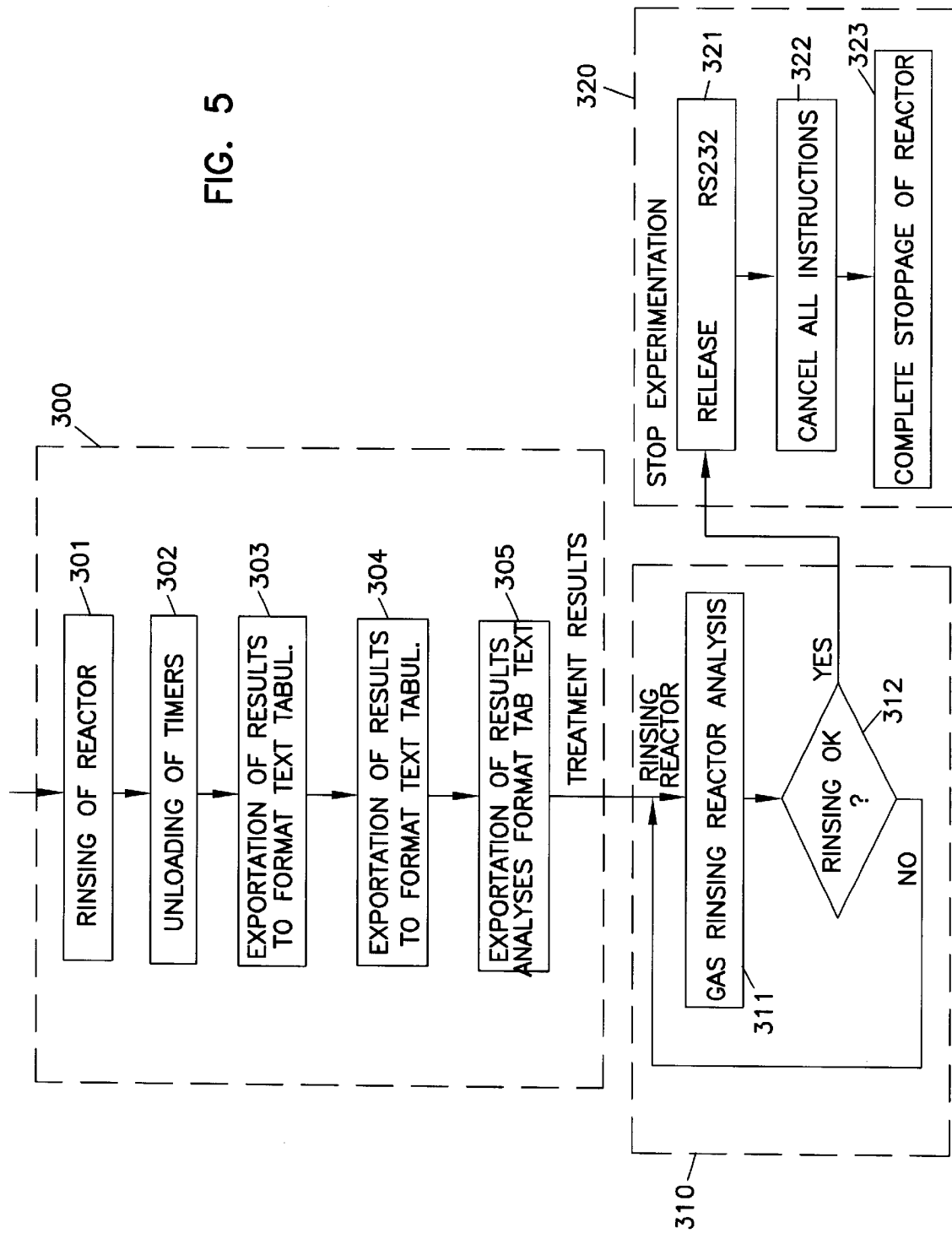

In FIG. 4, the access and control of the parameters at block 240 are achieved starting from the wait block 250 and the start block 260. The wait block conditions the start at step 251 as a function of the access of the parameters obtained at steps 252 to 257. The start is launched once the files of the flux and analysis events have been loaded at steps 261 to 266. The acquisition and control block 240 integrates the steps 241 to 246 of acquisition, display and comparison of the times elapsed in the events' tables of the preceding algorithm. The management of analyses at block 270 results from the application of the events at the decision step 271. The comparison between the time elapsed and the predetermined end time at step 272 refers back to the acquisition block 240. A block of modifications of the operating conditions 280 enables the start parameters at the entry of the acquisition block to be modified in three steps (281 to 283).

Finally, FIG. 5 illustrates the end of experimentation steps in three blocks 300, 310 and 320, concerning, respectively, the treatment of the results, the rinsing of the reactor and the cessation of experimentation. The treatment block 300, the steps 301 to 305 of rinsing, discharge of the timers and exportation of the results. The rinsing block includes a step 311 of analysis of the rinsing gas and a decisional step 312. The cessation block includes the steps 321 to 323 of test discontinuation, cancellation of the instructions and general cessation of the reactor.

Examples of use of the reactor according to the invention in different applications follow.

EXAMPLE 1

Use of Lipolytic Enzymes

The use of lipolytic enzymes makes possible the catalysis of different reactions as a function of the availability of water in the system.

This particular use of solid/gas phase catalysis opens up a large field of application with respect to molecules such as flavours or fragrances in particular. The methodology of use in such a system is furthermore relatively easy.

The optimal catalytic activity is obtained for maximal hydration of the catalyst, a situation which occurs just before the appearance of a separate aqueous phase represented by a sudden increase of the water content of the catalyst for a higher level of hydration. Once this hydration optimum is exceeded, the catalytic rate then falls sharply.

This loss of activity is irreparable and is the result of the thermodenaturation of the catalyst by the combined action of water and temperature, as the residual activity curve shows, measured at the hydration optimum after 24 hours continuous use at different initial conditions of hydration.

Thus, the appeal of solid/gas catalysis is clearly apparent in relation to the possibility of controlled continuous hydration of a biocatalyst, and the acquisition of the property of thermostability in the case of a temperature-sensitive enzyme in an aqueous medium.

EXAMPLE 2

Esterification Reaction

The production at atmospheric pressure of a range of esters of the butyrate and acetate families, of a maximal chain length of 9 carbon atoms was performed by the use of a lipase.

The control of the thermodynamic activities enables hydrolases to catalyse synthetic reactions, in contrast to their mode of action in an aqueous medium.

We have carried out the synthesis of propyl butyrate by means of a commercial catalyst, NOVOZYME 435 (lipase from C. antartica immobilized on a resin) starting from n-propanol and butyric acid.

This esterification reaction presents disadvantages due to the production of water during the reaction. The implementation of the invention takes into account the change in hydration which results on the last sections of the catalytic bed. The experiment shows that the choice of a catalyst capable of working efficiently at low thermodynamic activity and the activity of which is the least dependent on a variation of hydration enables the production of propyl butyrate to be optimized.

Hence solid/gas catalysis appears to be technologically viable for manufacturing clean products, without addition of solvent.

The results presented below in Table I relate to the extrapolation of the results obtained at the laboratory level with a quantity of supported catalyst of 50 mg (enzyme+support).

TABLE I

| Molar ratio: alcohol/acid | Acid input partial pressure (atm) | Nitrogen consumption (m3/h) | Ester production (kg/h) | Acid conversion (%) | Purity of dry product (% mass) |
| --- | --- | --- | --- | --- | --- |
| 1.0 | 0.020 | 36.9 | 4.00 | 83.2 | 83.1 |
| 1.5 | 0.020 | 36.5 | 4.50 | 95.0 | 77.2 |
| 2.0 | 0.020 | 36.0 | 4.55 | 97.5 | 66.4 |
| 1.2 | 0.020 | 36.2 | 5.40 | 92.3 | 83.7 |

Table I presents four embodiments for the production of a molecule, propyl butyrate, and for reactor dimensions with a capacity of 1 kg of catalyst. The working temperature is 80° C. The residence time in the reactor is of the order of 0.5 second. Since the equilibrium constant is about 40, the maximal conversion which can be attained is 83% for an acid/alcohol ratio of 1/1. It is, however, possible to increase the rate of conversion of one of the substrates by increasing the thermodynamic activity of the second. A downstream treatment is then necessary (distillation) to ensure the purification of the product and the recycling of the substrate in excess.

EXAMPLE 3

Synthesis of Butyl Acetate Starting from Glacial Acetic Acid and Butanol

The equilibrium constant of this reaction makes it possible to easily obtain a percentage conversion of more than 90% in the case where the substrates are used in an equimolar ratio. We have worked at a mole per mole input (alcohol/acid). The rate of conversion is closer to 100% and no loss of activity was observed during a period of operation of 24 h. These still preliminary and not optimized results lead to the production of about 5 kg of pure product/h for a catalytic bed capacity of 1 kg. It is quite possible to envisage an increase of this value but this must be confirmed experimentally.

EXAMPLE 4

Application of the Results Obtained by Solid/Gas Catalysis to the Development of Gas Phase Affinity Chromatography The maintenance of a degree of hydration consistent with stability with time and a three-dimensional conformation permitting the definition of the low energy interactions implicated in the process of enzymatic recognition (or between an antibody and an antigen) suffices to develop the concept of gas phase affinity chromatography.

A chromatography column with a graft comprising a grafted ligand enables the concept of gas phase affinity chromatography to be developed. By ligand is meant a molecule of any kind capable of binding specifically to a compound present in a reaction mixture. It may be an enzyme exhibiting an affinity for a substrate. It may be an antibody exhibiting an affinity for an antigen; in this case, the reaction enables the complex medium to be purified with respect to the undesirable antigen; optionally, the product retained in the one or other case may be recovered in purified form by modification of the physical chemical conditions of the medium.

These systems can trace molecules present at low concentration in a gas phase (for example: atmospheric pollutants) and thus permit a rapid and specific determination of said molecules.

EXAMPLE 5

Application of the Results Obtained by Solid/Gas Catalysis to the Development of Derivatization Precolumns The use of the catalytic activity opens the road to the development of derivatization precolumns for gas phase chromatography. The problems encountered traditionally in GC are the secondary interactions leading to trailing of the peak for certain compounds (e.g. free fatty acids on nonpolar columns) or the low volatility of the compounds to be analyzed (the case of the sugars). Thus, the experimenter very often has recourse to a derivatization step (methylation or ethylation) in order to solve these problems (reference). A solution intended to circumvent this step and facilitate the analysis is to intercalate between the injector and the separation column an active column equivalent to a small enzymatic reactor. The injection of the products to be analyzed in the presence of methanol for a methylation, for example, leads to derivatization in situ after injection of the compound but before its passage onto the column.

The invention is not limited to the examples described. The conversion of the liquid products into the vapour phase which constitutes the vector gas may be obtained, on the one hand, by any means permitting the expansion of these products within an injection chamber and, on the other, by the creation of reduced pressure between the outlet and inlet of the reactor by any known means. Moreover, the substrates may be in the gas phase as from the first stage of reaction.

The specialist skilled in the art will know how to integrate the most appropriate enzymatic reactor into a reactor in conformity with the invention, namely as a fixed or fluidized bed.

Certain embodiments of the invention are more suitable to certain applications. For example, in the case where a neutral vector gas is used, it seems important to minimize the consumption of this gas, in particular for an industrial application. In order to do this, this gas is preferably recycled by recompression at the vacuum pump outlet and by transference to a heat exchanger. The condensation of the reaction products and the purification of the vector gas, recyclable upstream from the mass flow meter, are then facilitated by coupling of the cold to the rise in pressure. In particular, the use of a vacuum pump coupled to a liquid ring compressor is indicated owing to their capacity to accept a considerable load of condensable products both on aspiration and on compression.

In the case of molecules difficult to condense, it is advantageous to dispense with the addition of nitrogen or air as well as the control valve upstream from the vacuum pump in order to minimize the dilution of the reaction products and thus to improve the efficiency of a condensation step. The control of the total pressure is then achieved by a valve placed between the reactor and the vacuum pump and regulated by the measurement of pressure made upstream of the reactor.

In the case of molecules difficult to separate because they are too volatile or their partial pressure very low compared to their saturation pressure at the temperature of the condenser, a molecular filtration system is added at the condenser outlet which allows the passage of the nitrogen to be recycled. In the context of depollution activities this solution leads to a diminution of the operational costs by avoiding the use of cryogenic fluid for trapping reaction products, provided these latter are present in the gas phase at very high dilutions.

Still in the context of activities linked to depollution, the coupling of a gas/gas pervaporation to the solid/gas biocatalysis may be an asset. Thus, in the case of the treatment of gases present at very high dilution, a gas/gas pervaporation step can advantageously precede the biocatalysis in order to make possible an enrichment of molecules to be eliminated before their passage into the bioreactor. In order to do this, the evaporator is then replaced by the permeate module of a pervaporation module and the permeate gas is introduced into the bioreactor by a gas pump serving as compressor. The increase of the pressure and the lowering of the temperature at the level of the reactor increase appreciably the activity of the molecules to be treated by a factor of 10 or 100. The pressure of the reactor is regulated by a flux restriction valve at the reactor outlet, the vacuum pump having been disconnected. In order to release into the atmosphere a clean gas or one containing only molecules whose toxicity has been abolished by the catalytic step, a second module of pervaporation coupled to a cryogenic condenser or exchanger is placed downstream from the flux restriction valve.

Moreover, in the case where the product has undergone a change of state, it is advisable to add a gas/solid separator at the reactor outlet, for example, of the cyclone effect type, when the product formed is solid or a gas/liquid separator if the product is liquid. Only the gas phase is then recycled towards the gas pumping group by passage through a pressure condenser.

What is claimed is:

1. A continuous process reactor comprising:
   (a) a first stage comprising a means for forming a gas mixture from at least one liquid substrate;
   (b) a second stage comprising a reaction chamber comprising a heat exchanger and a bioreactor containing a biological catalyst; and
   (c) a third stage comprising a means for controlling and analyzing a composition of an effluent from the reaction chamber and a vacuum pump coupled to a vacuum regulation valve and a vacuum break detector located at an outlet of the reaction chamber.

2. The continuous process reactor of claim 1, wherein the first stage further comprises an inlet for a vector gas.

3. The continuous process reactor of claim 1, wherein said means for forming a gas mixture comprises:
   (a) at least one flow controller for controlling the flow rate of at least one liquid substrate;
   (b) an expansion mixer for vaporizing each liquid substrate and forming a gas mixture; and
   (c) a first temperature controller comprising a first temperature probe for measuring the temperature of the gas mixture in said expansion mixer.

4. The continuous process reactor of claim 3, wherein the first stage further comprises an inlet for a vector gas.

5. The continuous process reactor of claim 4, wherein the vector gas is recycled at the reaction chamber outlet by recompression and passage through a heat exchanger for reintroduction into said expansion mixer.

6. The continuous process reactor of claim 1, wherein said at least one flow controller comprises a flow meter and a dosage pump to regulate the flow rate of each substrate into the expansion mixer.

7. The continuous process reactor of claim 3, wherein the expansion mixer comprises an ultrasonic head.

8. The continuous process reactor of claim 3, wherein the second stage further comprises a second temperature probe in said reaction chamber.

9. The continuous process reactor of claim 8, wherein the second temperature probe comprises a thermocouple and the pressure probe comprises a piezoresistive sensor.

10. The continuous process reactor of claim 1, wherein said bioreactor contains an enzyme preparation.

11. The continuous process reactor of claim 1, wherein the bioreactor contains a catalyst that is a whole cell, a cellular organelle, a protein, or a mixture thereof.

12. The continuous process reactor of claim 1, wherein said means for controlling the composition of the effluent comprises means for controlling a reaction temperature, a total pressure, and a molar composition of the gas mixture.

13. A continuous process reactor comprising:
   (a) at least one flow controller for controlling the flow rate of at least one liquid substrate;
   (b) an expansion mixer for vaporizing each liquid substrate and forming a gas mixture;
   (c) a reaction chamber comprising a heat exchanger and bioreactor containing a catalyst;
   (d) a pressure sensor located in said reaction chamber;
   (e) at least one temperature sensor comprising a temperature probe located in said expansion mixer and in said reaction chamber;
   (f) an analytical sampler located at an outlet of the reaction chamber;
   (g) a vacuum pump coupled to a vacuum regulation valve located at the outlet of the reaction chamber;
   (h) a command controller connected to and receiving data from the at least one temperature sensor, the flow controller, the pressure sensor, the analytical sampler and the vacuum regulation valve; and
   (i) a management processor coupled to the command controller, wherein the management processor receives the data from the command controller, performs a calculation using a management algorithm, and transmits a signal to the command controller for controlling a total pressure, the temperature, and a molar composition of the gas mixture, wherein said management algorithm manages over time the analytical sampler, temperature, total pressure, residence time of the gas in the mixer in the reaction chamber, and partial pressure of each substrate in the gas mixture.

14. The continuous process reactor of claim 13, wherein the analytical sampler comprises:
   (a) a sample loop that can be filled with a test sample by rotation of a pneumatically controlled multi-channel valve; and
   (b) an instrument to analyze the test sample.

15. The continuous process reactor of claim 14, wherein the test sample in the sample loop is injected into a gas chromatograph for determination of the composition of the test sample.

16. The continuous process reactor of claim 15, wherein the gas chromatograph has a sensor for detection of water and a sensor for detection of organic molecules.

17. The continuous process reactor of claim 13, wherein the molar concentration of the gas is controlled by adjusting the total pressure, the temperature, and flow of the substrate by determining the thermodynamic activity value of each substrate using the management algorithm.

18. The continuous process reactor of claim 13, wherein
   (a) the command controller receives data from the temperature sensor and the pressure sensor;
   (b) the command controller sends the data to the management processor;
   (c) the management processor treats the data with the management algorithm;
   (d) the management processor transmits a signal to the command controller based on a result obtained from the management algorithm; and
   (e) the command controller adjusts the vacuum regulation valve, the flow controller, and a temperature controller based on the signal supplied by the management processor.

19. The continuous process reactor of claim 18, wherein the management algorithm calculates a partial pressure, a reference saturation pressure, and a thermodynamic activity value for each substrate.

20. The continuous process reactor of claim 13, wherein the temperature sensor has an accuracy of $\pm 0.1$ °C. over a temperature range of 20 to 150° C., the pressure sensor has an accuracy of $\pm 1$ mbar, a dosage pump has an accuracy of $\pm 0.5\%$ of the maximum capacity of a flow meter, and the calculation of a saturation pressure has a maximum absolute error of $\pm 5(10^{-4})$ atmospheres.

21. The continuous process reactor of claim 13, wherein said bioreactor contains a biological catalyst.

22. The continuous process reactor of claim 13, wherein said bioreactor contains an enzyme preparation.

23. The continuous process reactor of claim 13, wherein the bioreactor contains a catalyst that is a whole cell, a cellular organelle, a protein, or a mixture thereof.

24. A reactor comprising:
   (a) a first stage capable for forming a gaseous mixture, the first stage comprising
      (i) an expansion mixer capable of vaporizing at least one liquid substrate and forming a gas mixture;
      (ii) at least one flow controller that controls the flow rate of at least one substrate into the expansion mixer;
      (iii) a first temperature sensor that measures the temperature of the gas mixture in the expansion mixer;
   (b) a second stage capable of reacting the gaseous mixture, the second stage comprising
      (i) a reaction chamber comprising a heat exchanger and a bioreactor chamber;
      (ii) a second temperature sensor operably connected to the reaction chamber;
      (iii) a pressure sensor operably connected to the reaction chamber;
   (c) a third stage capable of controlling the reactor and analyzing an effluent from the reaction chamber, the third stage comprising
      (i) a vacuum source coupled to the reaction chamber and controlled by a vacuum source regulator;
      (ii) a sampling device located at an outlet of the reaction chamber;
      (iii) an analysis device coupled to the sampling device;
      (iv) a third temperature sensor that measure the temperature in the sampling device;
      (v) a command controller interfaced to a plurality of control devices for sending and receiving control data associated with the control devices, the control devices including the first, second, and third temperature sensors, the pressure sensor, the vacuum source regulator, the sampling device, and the analysis device;
      (vi) a management processor coupled to the command controller, wherein the management processor receives control data from the command controller, generates a control signal for controlling a total pressure, the temperature, and a molar composition of the gas mixture and transmits the control signal to the command controller, such that said first, second and third temperature sensors, the pressure sensor, the vacuum source regulator, the sampling device, and the analysis device are controlled.

25. The reactor of claim 24, wherein the bioreactor chamber contains a catalyst that is an enzyme preparation.

26. The reactor of claim 24, wherein the bioreactor chamber contains a catalyst that is a whole cell, a cellular organelle, a protein, or a mixture thereof.

* * * * *